United States Patent [19]
Whitesides

[11] 3,794,123
[45] Feb. 26, 1974

[54] CULTIVATOR

[75] Inventor: Jack C. Whitesides, Columbus, Ga.

[73] Assignee: Kelly Manufacturing Company, Tifton, Ga.

[22] Filed: May 18, 1972

[21] Appl. No.: 254,434

[52] U.S. Cl.............. 172/624, 172/152, 172/187, 172/642
[51] Int. Cl.... A01b 21/04, A01b 39/08, A01b 5/04
[58] Field of Search... 172/140, 152, 187, 264, 265, 172/610, 613, 619–621, 624, 629, 631, 640, 642, 643, 645, 649, 654–657, 527, 551, 572, 685–688, 691, 694, 696, 697, 705, 706, 709, 714

[56] References Cited
UNITED STATES PATENTS

| | | | |
|---|---|---|---|
| 1,817,851 | 8/1931 | Shelton | 172/705 X |
| 2,437,581 | 3/1948 | Wray | 172/709 X |
| 2,725,649 | 12/1955 | Santos | 172/572 X |
| 3,452,826 | 7/1969 | Lehman | 172/551 |

FOREIGN PATENTS OR APPLICATIONS
161,957  5/1952  Australia............................ 172/705

OTHER PUBLICATIONS
Rolling Cultivator, Owner's Manual, Model 2000, Lilliston Implement Co., 3/20/65

Primary Examiner—Robert E. Pulfrey
Assistant Examiner—Paul T. Sewell
Attorney, Agent, or Firm—Jones, Thomas & Askew

[57] ABSTRACT

A cultivator including a framework for towing along a plurality of crop rows by a tractor and a plurality of rotary hoe gangs mounted on the framework which rotatably engage and till the soil below the framework. A group of four rotary hoe gangs is provided for each crop row, with one pair of rotary hoe gangs being independently movable about an axis extending along the crop row, and with another pair of rotary hoe gangs being independently movable about an axis extending transverse to the crop row.

8 Claims, 3 Drawing Figures

PATENTED FEB 26 1974 3,794,123

CULTIVATOR

BACKGROUND OF THE INVENTION

Cultivators for tilling the soil have been developed which include a plurality of rotary hoe gangs for penetrating and breaking up the soil. Each rotary hoe gang usually includes a plurality of rotary hoes having tines or fingers which radiate outwardly from a central hub and penetrate the soil, and a plurality of gangs of rotary hoes usually are arranged in a group for each crop row. One or more rotary hoe gangs might be arranged to till the soil forming the crop row while another pair of rotary hoe gangs might be arranged to till the soil on each side of the crop row in the areas between the next adjacent crop rows. Preferably each rotary gang should be independently movable with respect to one another so that when areas of the ground which are not level are being cultivated the rotary hoe gangs tilling a high spot in the ground will not lift the other rotary hoe gangs which are tilling a low spot away from the ground.

While independent suspension systems have been used in the past for rotary hoe gangs in a cultivator, the prior art systems are cumbersome and are not versatile in that the gangs of rotary hoes occasionally cannot be placed in desired positions to properly till the crop. For instance, the rotary hoe gangs cannot be moved close enough together to till the soil without leaving an untilled strip in the soil. In addition, the suspension systems required in the past to independently suspend the rotary hoe gangs of a cultivator have been so heavy and cumbersome that it is onerous for the operator of a cultivator to reposition the rotary hoe gangs when cultivating various crops.

SUMMARY OF THE INVENTION

Briefly described, the present invention comprises a cultivator which utilizes a plurality of independently suspended rotary hoe gangs to till the soil along a plurality of crop rows. The rotary hoe gangs are mounted on a framework and are adjustable with respect to the framework so that the gangs of rotary hoes can be positioned in various different arrangements, including arrangements where virtually all of the soil along a crop row can be tilled without leaving any untilled portions. The cultivator has its rotary hoe gangs arranged in groups for each crop row, with each group including one pair of rotary hoe gangs each being swingable about an axis normally extending along the crop row, and a second pair of rotary hoe gangs each being swingable about an axis extending normally transverse to the crop row. The first pair of rotary hoe gangs are each mounted on a laterally extending support leg which extends across the crop row from its respective rotary hoe gang, and the rotary hoe gang of each laterally extending support leg can be positioned along the length of its support leg in overlapping or spaced relationship with respect to the other rotary hoe gangs of the group in various lateral positions along the crop row to be tilled by the group of rotary hoes.

Thus, it is an object of the present invention to provide a cultivator which is versatile in operation, inexpensive to construct and maintain, and which can be expediently adjusted to cultivate various different crops.

Other objects, features and advantages of the present invention will become apparent upon reading the following specification, when taken in conjunction with the accompanying drawing.

DESCRIPTION OF THE PREFERRED EMBODIMENT

Figure 1:
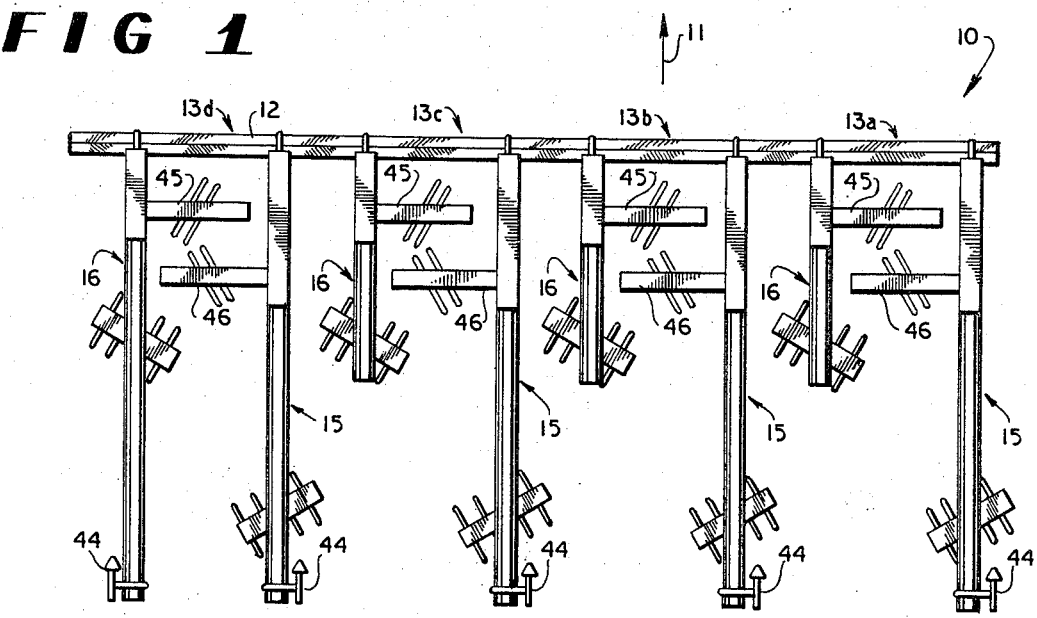
FIG. 1 is a plan view of the cultivator.
Figure 2:
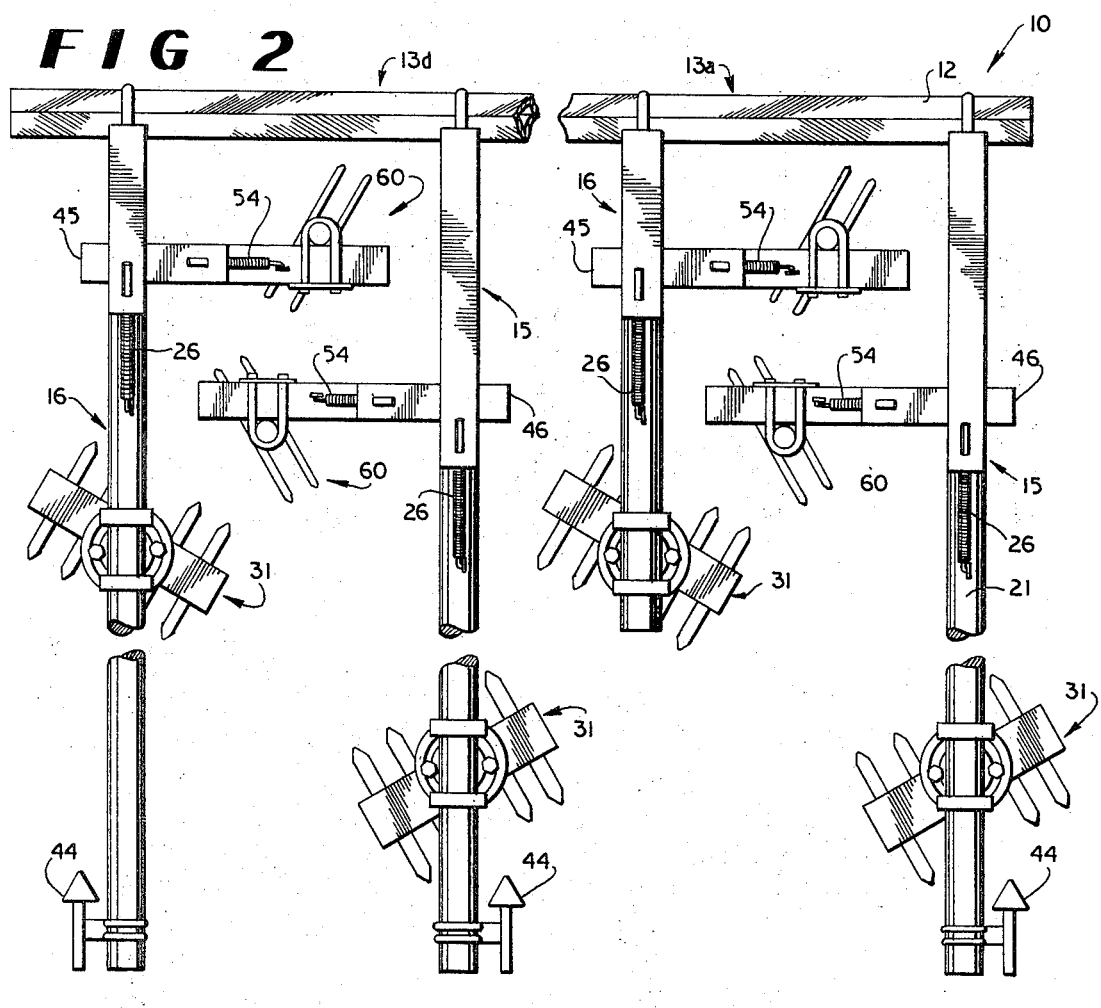
FIG. 2 is a plan view of a section of the cultivator, showing two groups of rotary hoe gangs.
Figure 3:
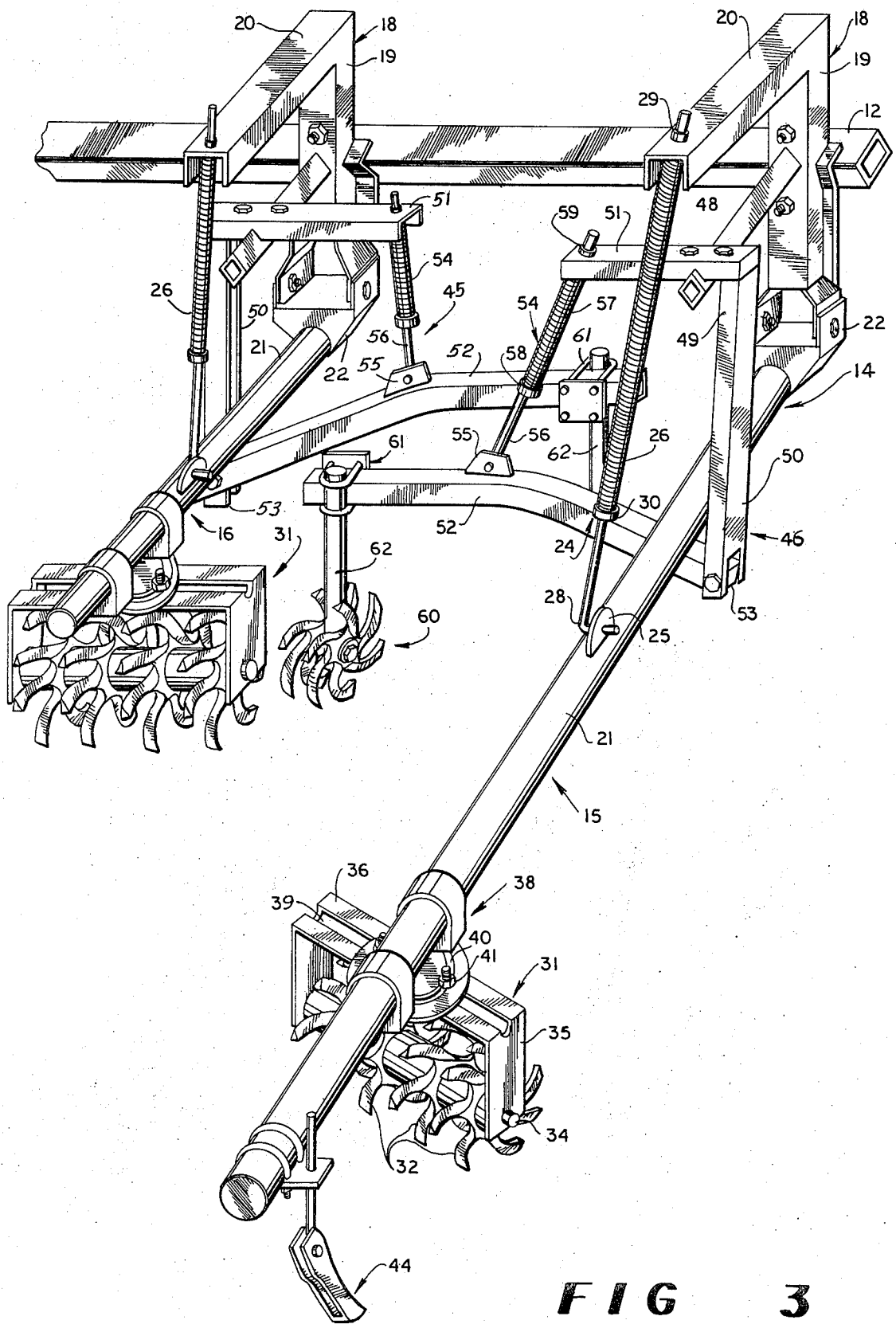
FIG. 3 is a perspective view of the cultivator, showing one section of the cultivator.

Referring now in more detail to the drawing, in which like numerals indicate like parts throughout the several views, FIG. 1 discloses a cultivator 10 of the type to be towed by a tractor or similar towing vehicle along a plurality of crop rows in a farmer's field. The cultivator 10 is normally moved in a forward direction of movement as indicated by arrow 11 along the crop rows, and the cultivator includes a draw bar member such as draw bar 12 which together with other supporting elements of the cultivator forms a framework 14, and a plurality of similar groups of crop row cultivating elements are arranged in sections transversely across the cultivator. For instance, cultivator 10 includes sections 13a, 13b, 13c and 13d. Each section 13a–13d includes a group of rotary hoes, plows, and other soil tilling elements which are arranged to cultivate or till the soil of a single crop row. As is illustrated in FIGS. 2 and 3, each cultivator section includes support bar assemblies 15 and 16, each of which comprises L-shaped support bracket 18 having a vertical leg 19 attached to draw bar 12 by a clamp and upper horizontal leg 20. Tool support bar 21 is attached to the lower end of vertical leg 19 by means of clevis assembly 22, and spring assembly 24 is connected between support bar 21 and the upper horizontal leg 20 of the L-shaped bracket 18. Spring assembly 24 is connected to apertured tab 25 of support bar 21 and includes coil compression spring 26 surrounding rod 28, and the rod protrudes through an opening in the upper horizontal leg 20 of L-shaped bracket 18. Retaining nut 29 is threaded about the upper end of rod 28 and collar 30 about its lower end, so that coil compression spring 26 urges support bar 21 in a downward direction about its clevis assembly 22.

A gang of rotary hoes 31 is connected to support bar 21 and includes a plurality of rotary hoes 32 arranged on a common axle 34, with the ends of the common axle being mounted in the downwardly extending side legs of inverted U-shaped bracket 35. The upper lateral leg 36 of bracket 35 is connected to support bar 21 by means of clamp 38. The upper lateral leg 36 of bracket 35 includes a slot 39 extending along its length, while clamp assembly 38 defines a pair of arcuate slots 40 on opposite sides of support bar 21. Bolts 41 are threaded through the aligned slots 39 and 40 to connect the gang 31 of rotary hoes to the support bar, and the mating slots 39 and 40 allow the gang to be moved laterally of the longitudinally extending support bar and to be twisted about an axis perpendicular to the support bar. In addition, clamp assembly 38 can be twisted about support bar 21 so as to tilt the rotary hoe gang 31, and the overall arrangement is such that the rotary hoes of a rotary hoe gang 31 can be positioned in various positions with respect to the support bar to cultivate sloped surfaces of the crop row, to be positioned on one side or the other side of the support bar, or to be angled so as to expel dirt to either side of the support bar.

Support bar 21 supports at its distal end a plow 44 which is suspended out to the side of the support bar and is normally positioned to create a furrow in the area between adjacent crop rows.

The tool support bar of support bar assembly 16 is similar to the tool support bar of support bar assembly 15 except that it is foreshortened. The adjacent section of the cultivator supports the plow assembly for the next adjacent crop row, and the rotary hoe gang 31 of tool support bar assembly 16 is spaced forwardly of rotary hoe gang 31 of tool support bar assembly 15. Thus, there is no need to extend the length of the support bar of support bar assembly 16 as far as the extension of the support bar of support bar assembly 15. The remaining elements of support bar assembly 16 are substantially identical to those of support bar assembly 15.

Support leg assemblies 45 and 46 are substantially identical and each is attached to a stub support bar 48 extending rearwardly from vertical leg 19 of L-shaped support bracket 18. Support leg assembly 45 includes L-shaped bracket 49 which includes lower vertical leg 50 and upper horizontal leg 51. The upper horizontal leg 51 is clamped onto stub support bar 48, and pivotal support leg 52 is pivotally connected at one of its ends by clevis assembly 53 to the lower end of vertical support leg 50 of L-shaped bracket 49. Spring assembly 54 extends between pivotal support leg 52 and upper horizontal leg 51 of L-shaped bracket 49. Apertured tab 55 receives the lower end of rod 56, and coil compression spring 57 extends between collar 58 which is clamped to rod 56 and horizontal leg 51 of L-shaped bracket 49. Nut 59 retains the upper end of rod 56 in its opening through L-shaped bracket 49.

A gang of rotary hoes 60 is mounted on pivotal support leg 52 by means of clamp 61 and stanchion 62. Rotary hoe gang 60 can be twisted along the longitudinal axis of stanchion 62 in clamp 61, and clamp 61 can be moved along the length of pivotal support leg 52 so as to move the rotary hoe gang 60 laterally with respect to the direction to forward movement of the cultivator along the crop row.

Clevis assembly 22 is constructed so that tool support bar 21 is pivotal at its forward end around an axis which is transverse to the direction of forward movement of the cultivator along the crop rows, which causes the rotary hoe gang 31 and plow assembly 44 to be swingable about the transverse axis. The weight of the tool support bar, the rotary hoe gang and other movable elements which are suspended from the rigid framework together with the coil compression spring assembly 24 causes the rotary hoe gang and plow assembly to be urged into the soil so that the tilling of the soil will occur as the cultivator moves in a forward direction along the crop rows. Since each of the tool support bars 21 of the support bar assemblies 15 and 16 of each section 13a–13d are similarly independently suspended with respect to the framework, each rotary hoe gang supported by a tool support bar 21 will be urged into the soil without regard to high spots or low spots in the ground along the crop rows.

In a similar manner, each rotary hoe gang 60 of the support leg assemblies 45 and 46 of each section 13a–13d of the cultivator is pivotal about a clevis assembly 53 at the intersection of the pivotal support legs 52 and the vertical legs 50 of the L-shaped brackets 49, which causes each of the pivotal support legs 52 to pivot about an axis which extends along the normal direction of forward movement of the cultivator along the crop rows, causing each of the rotary hoe gangs 60 mounted on the pivotal support legs to be swingable about a longitudinal axis. The weight of each rotary hoe gang 60 and the remaining movable elements of the support leg assemblies together with the coil compression spring assembly 54 provides independent suspension for each rotary hoe gang 60 so that each of these rotary hoe gangs will be urged into and till the soil of the crop rows without regard to high spots and low spots along the crop rows.

The pivotal support legs 52 of each of the support legs assemblies 45 and 46 are connected to the lower end of each vertical leg 50 of an L-shaped support bracket on one side of a crop row, and the rotary hoe gang which is supported at the other end of the pivotal support leg 52 is located on the other side of the crop row. The support legs of each support leg assembly 45 and 46 therefore normally extend across and overlap the crop row, and the rotary hoe gang of each pivotal support leg 52 can be moved along the length of the pivotal support leg so that the paths of the rotary hoe gangs can be positioned in overlapping or offsetting relationship with respect to each other across a crop row, as may be desired by the operator of the cultivator. Since the support leg assemblies 45 and 46 are offset longitudinally along the length of the cultivator, the support leg assemblies 45 and 46 will not interfere with each other during normal operation of the cultivator. In addition, the longitudinal offsetting relationship of the rotary hoe gangs 31 of the support bar assemblies 15 and 16 allow the support bar assemblies to be moved closer together or further apart without having the rotary hoe gangs clash with each other. Therefore, the rotary hoe gangs of each section 13a-13d comprise a first pair of rotary gangs 60 each of which is pivotal about an axis extending longitudinally along the crop row or along the direction of movement of the cultivator, and a second pair of rotary hoe gangs 31 each of which is pivotal about an axis which is transverse to the crop rows or transverse to the normal direction of movement of the cultivator in a forward direction along the crop rows.

While this invention has been described in detail with particular reference to a preferred embodiment thereof, it will be understood that variations and modifications can be effected within the spirit and scope of the invention as described hereinbefore and as defined in the appended claims. I claim:

1. A cultivator comprising a framework for towing by a tractor or the like in a forward direction over the ground along crop rows, a first gang of rotary hoes mounted on said framework for rotatably engaging a crop row closely adjacent the crop in the crop row and arranged to swing with respect to said framework about an axis extending normally approximately parallel to the direction of forward movement of said framework and laterally displaced from the first gang of rotary hoes across the crop row, and a second gang of rotary hoes mounted on said framework for rotatably engaging a crop row further away from the crop in the crop row than said first gang and arranged to swing with respect to said framework about an axis extending transverse to the direction of forward movement of said framework.

2. A cultivator comprising a framework for towing along crop rows by a tractor or the like and a plurality of rotary hoe gangs mounted on said framework for rotatably engaging the ground below said framework, the improvement therein of means for independently moving some of said gangs of rotary hoes about axes extending along the crop rows comprising a support leg having mounted thereon at a first one of its ends a gang of rotary hoes normally positioned on one side of a crop row and its other end normally positioned on the other side of the crop row from its gang of rotary hoes and mounted on said framework at its other end and pivotal at its other end about an axis extending generally along the crop row.

3. A cultivator comprising a framework for towing by a tractor or the like in a forward direction over the ground and including a draw bar member normally extending transverse to the forward direction of movement of said framework and a plurality of support bars mounted on said draw bar member and normally extending approximately parallel to the forward direction of movement of said framework, a pivotal support leg mounted on some of said support bars and each pivotal support leg extending transverse to the forward direction of movement of said framework and pivotal about an axis approximately parallel to the forward direction of movement of said framework with adjacent ones of the pivotal support legs extending in opposite directions with respect to each other from their respective support bars and in overlapping relationship along the forward direction of movement of said framework, with the overlapping pivotal support legs being offset from each other along the forward direction of movement of said framework, a gang of rotary hoes mounted on at least some of said pivotal support legs for rotatably engaging the ground below said framework as said framework moves in a forward direction over the ground, and a gang of rotary hoes mounted on at least some of the others of said support bars for rotatably engaging the ground below said framework.

4. The cultivator of claim 3 and wherein the support bars on which said pivotal support legs are mounted are rigidly connected to said draw bar member, and wherein the other support bars on which said rotary hoes are mounted are pivotally mounted with respect to said draw bar member about an axis transverse to the forward direction of movement of said framework.

5. In a cultivator comprising a framework for towing by a tractor or the like in a forward direction along a plurality of crop rows with a plurality of gangs of rotary hoes mounted on said framework and arranged to rotatably engage the crop rows, the improvement therein of said gangs of rotary hoes being arranged in groups for each crop row, with each group of gangs of rotary hoes comprising a first pair of gangs of rotary hoes with each gang of said first pair being mounted on a pivotal support leg and movable along the length of said pivotal support leg, said pivotal support leg normally extending across a crop row and being arranged to swing about an axis extending approximately parallel to the crop row, and a second pair of gangs of rotary hoes with each gang of said second pair arranged to swing about an axis extending transverse to the crop row.

6. The cultivator of claim 5 and wherein each gang of rotary hoes of said first pair of gangs of rotary hoes of each group of gangs has its axis about which it swings normally disposed on the opposite side of its crop row.

7. A cultivator comprising a framework for towing along crop rows by a tractor or the like and a plurality of rotary hoe gangs mounted on said framework for rotatably engaging the ground below said framework, the improvement therein of means for independently moving some of said gangs of rotary hoes about axes extending along the crop rows and means for independently moving some of the others of said gangs about axes extending transverse to the crop rows, said means for independently moving some of said gangs of rotary hoes about axes extending along the crop rows comprising for each gang of rotary hoes a support leg connected at a first one of its ends to a gang of rotary hoes and mounted on said framework at its other end and pivotal at its other end about an axis extending generally along the crop row, and said axis normally being positioned on the other side of the crop row from its gang of rotary hoes.

8. A cultivator comprising a framework for towing by a tractor or the like in a forward direction over the ground along crop rows, a first pair of gangs of rotary hoes spaced from each other along the forward direction of movement of said framework and closely spaced from each other across the forward direction of movement of said framework for rotatably engaging opposite sides of a crop row closely adjacent the crop in the crop row, each of said gangs of rotary hoes of said first pair of rotary hoes being mounted on a pivotal support leg and the pivotal support leg normally extending over the crop row from its gang of rotary hoes and pivotally mounted on the other side of the crop row on said framework, and a second pair of gangs of rotary hoes spaced from each other across the forward direction of movement of said framework a distance greater than the spacing of said first pair of gangs of rotary hoes across the direction of movement of said framework for rotatably engaging opposite sides of the crop row further away from the crop in the crop row than said first pair of gangs of rotary hoes.

* * * * *